United States Patent [19]
Watanabe et al.

[11] Patent Number: 5,552,847
[45] Date of Patent: Sep. 3, 1996

[54] LENS BARREL

[75] Inventors: Tsuneo Watanabe, Kawasaki; Yoshiharu Shiokama, Chiba-ken, both of Japan

[73] Assignee: Nikon Corporation, Tokyo, Japan

[21] Appl. No.: 339,285

[22] Filed: Nov. 7, 1994

Related U.S. Application Data

[63] Continuation of Ser. No. 961,333, Oct. 19, 1992, abandoned.

[30] Foreign Application Priority Data

Oct. 25, 1991 [JP] Japan .................... 3-306514
Jan. 7, 1992 [JP] Japan .................... 4-018514

[51] Int. Cl.⁶ .................... G03B 1/18; G03B 17/00
[52] U.S. Cl. .................... 354/195.12; 354/286
[58] Field of Search .................... 354/195.1, 195.12, 354/402, 403, 404, 405, 406, 407, 408, 409, 286

[56] References Cited

U.S. PATENT DOCUMENTS

| | | | |
|---|---|---|---|
| 5,412,448 | 5/1995 | Kunishige | 354/400 |
| 4,390,260 | 6/1983 | Prinz | 354/65 |
| 4,931,821 | 6/1990 | Hamada et al. | 354/402 |
| 4,982,216 | 1/1991 | Kudo et al. | 354/400 |
| 5,012,273 | 4/1991 | Nakamura et al. | 354/485 |
| 5,122,826 | 6/1992 | Kodaka | 354/402 |
| 5,124,738 | 6/1992 | Yamashita | 354/400 |
| 5,130,734 | 7/1992 | Taniguchi et al. | 354/400 |
| 5,146,071 | 9/1992 | Ookubo et al. | 354/402 |
| 5,150,144 | 9/1992 | Soshi et al. | 354/400 |
| 5,159,377 | 10/1992 | Suzuki et al. | 354/400 |
| 5,196,879 | 3/1993 | Hata | 354/400 |
| 5,196,880 | 3/1993 | Ishibashi et al. | 354/400 |

FOREIGN PATENT DOCUMENTS 59-46631   3/1984   Japan .

*Primary Examiner*—Michael L. Gellner
*Assistant Examiner*—Nicholas J. Tuccillo
*Attorney, Agent, or Firm*—Shapiro and Shapiro

[57] ABSTRACT

A lens barrel mountable on a camera body includes a phototaking lens system, an absolute position detecting device for detecting the absolute position of the phototaking lens system in the axial direction, a phototaking distance data memory device for storing phototaking distance data corresponding to the absolute position of the phototaking lens system, an aberration data memory device for storing aberration data between a predetermined image plane and the actual image plane of the phototaking lens system, and a calculation device for correcting the phototaking distance data based on the aberration data, wherein the corrected phototaking distance data are transferred to the camera body.

28 Claims, 5 Drawing Sheets

LENS BARREL

This is a continuation of application Ser. No. 07/961,333 filed Oct. 15, 1992, now abandoned.

BACKGROUND OF THE INVENTION

1. Field of the Invention

The present invention relates to a lens barrel which is mountable on a camera, and is capable of transferring data stored in a ROM to the camera body through electrical contacts connected when the lens barrel is mounted on the camera.

2. Related Background Art

In photography, information on the phototaking distance, such as the distance to the main object or the phototaking magnification representing the size of the object on the image frame can be used for many purposes, such as exposure control in a flash phototaking operation and multi-pattern light metering for determining the exposure by individually measuring plural areas in the image frame. Such information is therefore useful for achieving multiple functions in the camera.

Japanese Patent Laid-Open Application No. 59-46631 has proposed a camera system in which data on the phototaking distance corresponding to the moving amount of a focusing member on the lens barrel are memorized in a ROH provided in the lens barrel, and, upon detection of the position of the focusing member, the corresponding data on the phototaking distance are transferred to the camera body.

In the above-mentioned prior art, the information has been described to represent the phototaking distance by data corresponding to the apex value of the set phototaking distance, but the specific data format or the method of exact transfer of said information on the phototaking distance to the camera body has not been clarified.

Valably, even if the absolute position of the focusing lens is detected and the data on the phototaking distance corresponding to said position are output, said data cannot be effectively utilized, because such data involve errors such as the error in the detection of an encoder, error in the manufacture of the optical system and fluctuation in the adjustment thereof.

In order to guarantee the accuracy of the data on phototaking distance in the lens barrel of the above-explained structure, the focal plane of the phototaking lens system has always to coincide with a predetermined focal plane (film plane).

However, in various cases, the focal plane of the phototaking lens system becomes aberrated (deviated) from the film plane and the accuracy of the data on the phototaking distance is deteriorated.

The following cases are illustrative:

(1) Positional fluctuation of the phototaking lens system by the FFD (flange-focus distance) adjustment;
(2) Focus displacement by zooming;
(3) Focus displacement caused by lens expansion or contraction resulting from temperature change; and
(4) Variation in aberrations depending on phototaking distance.

In each of the above cases, the actual focal plane of the phototaking lens becomes aberrated from the designed focal plane (film plane), so that an error is generated between the phototaking distance data memorized in the ROM and the actual phototaking distance.

Regarding case (1), FFD refers to the distance between a predetermined image plane of the optical system (film plane in case of camera) and a reference position of the lens (reference face of the bayonet mount in case of camera), and the FFD adjustment means the adjustment of the lens position in such a manner that the light beam from the infinite distance is focused on the predetermined image plane.

For example, for a target value of FFD=A, the lens before adjustment is generally in a state FFD=A+$\alpha$ and an adjustment $\alpha \to 0$ is conducted. However, since it is practically difficult to bring $\alpha$ to zero completely, the adjustment is executed into a range FFD=A±dA.

In the above-mentioned four cases, the variation of phototaking distance per unit amount of movement of the phototaking optical system is particularly large in the vicinity of infinite distance, so that the error in the phototaking distance data becomes very large.

Also the error mentioned in case (1) cannot be corrected in advance in uniform manner, because the lens barrels have individual fluctuations within the tolerance of FFD adjustment.

SUMMARY OF THE INVENTION

In consideration of the foregoing, an object of the present invention is to provide a phototaking lens device and a camera system which enable the determination of phototaking distance with high accuracy.

Another object of the present invention is to provide a lens barrel capable of suitably correcting the phototaking distance data, even in case an error factor is generated in the phototaking distance data, thereby improving the precision of the phototaking distance data.

Still another object of the present invention is to provide a lens barrel capable of suitably correcting the phototaking distance data, even in case error factors fluctuate among the lens barrels.

The phototaking lens device of the present invention, adapted to be mounted on a camera body and capable of transferring data to said camera body through electrical contacts to be connected at said mounting, comprises an encoder device for detecting the absolute position of a focusing lens group on the optical axis, memory means for storing phototaking distance data, representing the set phototaking distance corresponding to the output of said encoder device, and phototaking distance error data, corresponding to the possible range of error between the actual phototaking distance and the above-mentioned phototaking distance data, and an output device for outputting said phototaking distance data and said phototaking distance error data.

The above-mentioned device can further be characterized by a fact that said phototaking distance data is a value determined by an equation composed of a term including the logarithm of said set phototaking distance and a constant term, and that said phototaking distance error data is a value determined by an equation including the logarithm of a ratio of said actual phototaking distance corresponding to said error to said set phototaking distance represented by said phototaking distance data.

Also a camera system of the present invention is adapted for mounting of said phototaking lens device, and comprises a signal processing device for receiving said phototaking distance data and said phototaking distance error data from said output device of the phototaking lens device, and varying the processing of said phototaking distance data according to said phototaking distance error data.

Also the phototaking lens device of the present invention, adapted to be mounted on a camera body and capable of transferring data to said camera body through electrical contacts to be connected at said mounting, may comprise an encoder device for detecting the absolute position of a focusing lens group on the optical axis, memory means for storing phototaking distance data, representing the set phototaking distance corresponding to the output of said encoder device, focal length data representing the focal length of said phototaking lens, and magnification correction data, which represents a correction coefficient for determining the set phototaking magnification from said phototaking distance data and said focal length data and which is not varied by the phototaking distance, and an output device for outputting said phototaking distance data, said focal length data and said magnification correction data.

Also the camera system of the present invention, adapted for mounting of the above-mentioned phototaking lens device, may be featured by the presence of a signal processing device for receiving said phototaking distance data, said focal length data and said magnification correcting data from said phototaking lens device and effecting a calculation for determining the set phototaking magnification, according to Said data.

The present invention enables more precise control in consideration of the error in the phototaking distance data, by transmitting the phototaking distance data and the error data to the camera body.

For example, it is rendered possible, in case the error is large, to use the phototaking distance data not for the actual control but only as a reference value, and, if the error is small, to use the phototaking distance data as a control value, for example, in the automatic flash phototaking mode.

Also the information on the phototaking magnification can be obtained more exactly through the use of the magnification correcting data which is not varied by the phototaking distance, and the capacity of the memory means (ROM) storing said data can be reduced, as said data is fixed regardless of the phototaking distance.

Also the lens barrel of the present invention, adapted to be mounted on a camera body and capable of transferring data, stored in memory means, to said camera body through electrical contacts connected upon said mounting, comprises absolute position detecting means for detecting the absolute position of a phototaking lens system on the optical axis, phototaking distance data memory means for storing phototaking distance data corresponding to the absolute position of said phototaking lens system, aberration data memory means for storing the aberration data between the predetermined image plane and the actual focal plane of the phototaking lens system, and calculation means for correcting said phototaking distance data according to said aberration data.

Also the lens barrel of the present invention, adapted to be mounted on a camera body and capable of transferring data, stored in memory means, to said camera body through electrical contacts connected upon said mounting, comprises absolute position detecting means for detecting the absolute position of a phototaking lens system on the optical axis, phototaking distance data memory means for storing phototaking distance data corresponding to the absolute position of said phototaking lens system, image plane movement data memory means for storing data on the amount of movement of the image plane from an infinite distance image plane, corresponding to the absolute position of said phototaking lens system, aberration data memory means for storing aberration data between a predetermined image plane and the actual focal plane of said phototaking lens system, and calculation means for correcting said phototaking distance data, based on said displacement data and said aberration data.

In these configurations, said aberration data can be the amount of aberration between the image plane of the phototaking lens system after FFD adjustment and the predetermined image plane.

Also said aberration data can be the amount of aberration between the focal plane of the phototaking lens system and the predetermined image plane, resulting from a change in the focal length.

Furthermore, said aberration data can be the amount of aberration between the focal plane of the phototaking lens system and the predetermined image plane, resulting from a change in aberrations in case of a change in the focal length.

DETAILED DESCRIPTION OF THE PREFERRED EMBODIMENTS

Now the present invention will be described in detail with reference to preferred embodiments thereof shown in the attached drawings.

Figure 6:
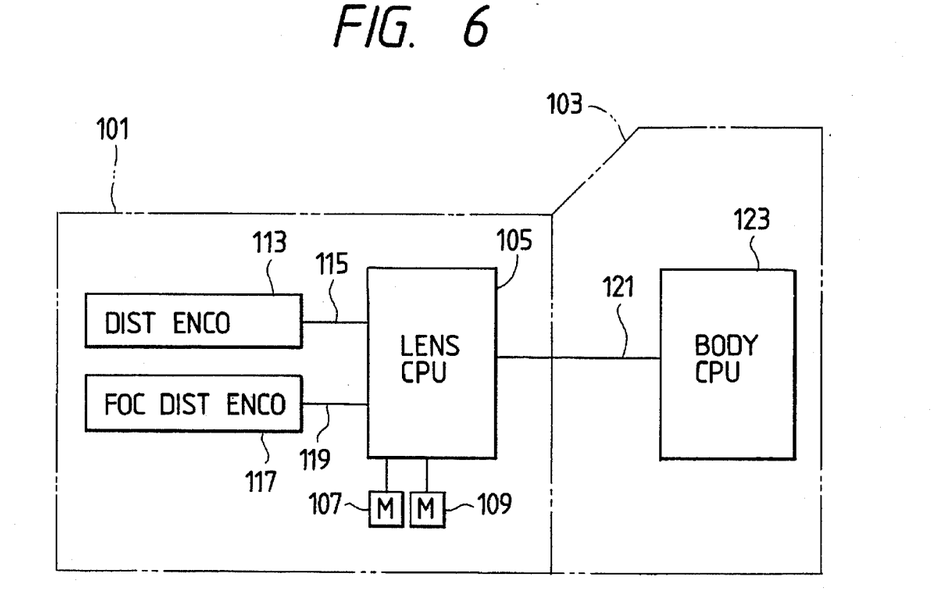
FIG. 6 is a block diagram of a camera system constituting another embodiment of the present invention.

FIG. 6 is a block diagram showing embodiments of a camera system and a phototaking lens device of the present invention.

Figure 1:
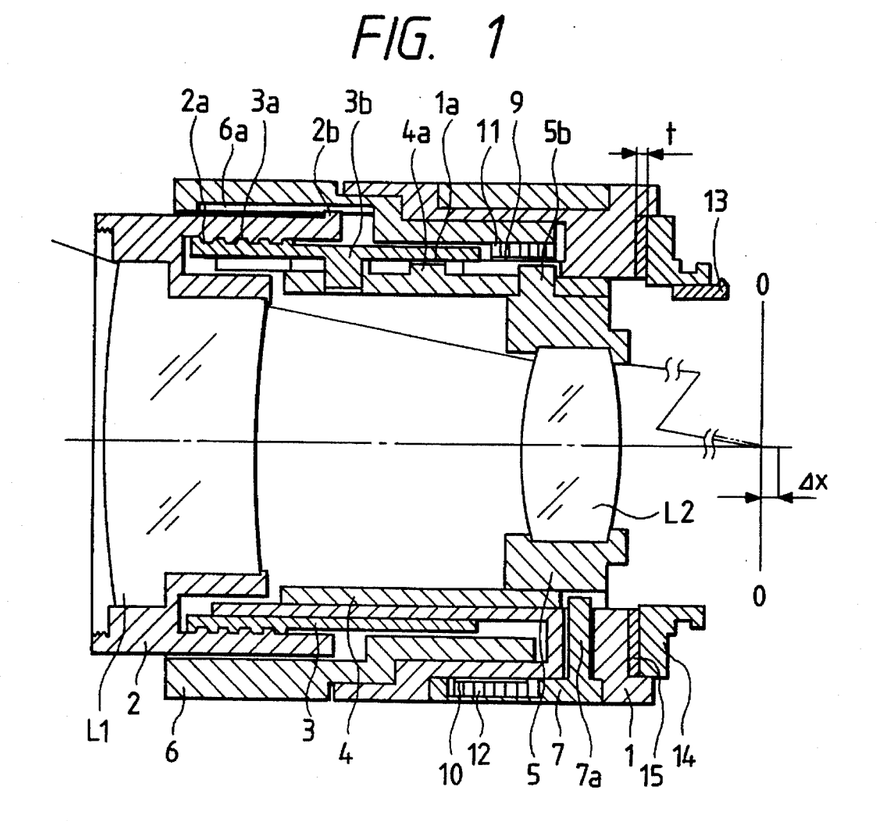
FIG. 1 is a longitudinal cross-sectional view of an embodiment of the lens barrel of the present invention.
Figure 2:
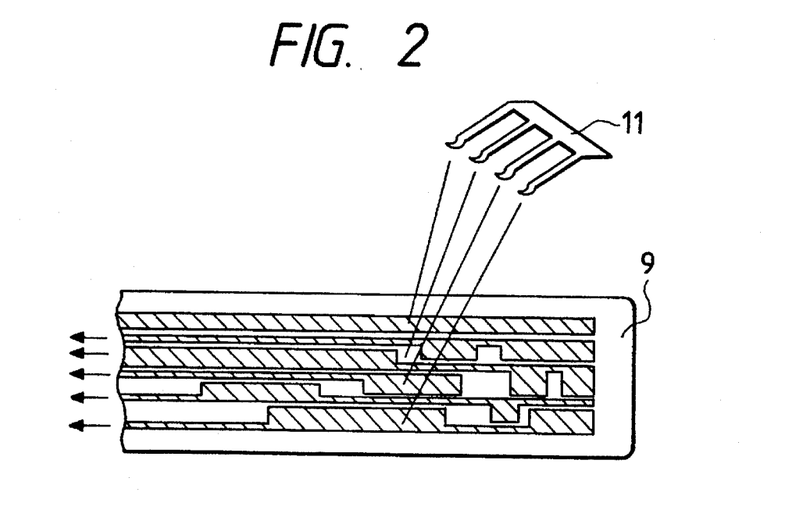
FIG. 2 is a view showing the pattern of a position detecting encoder of a focusing optical system provided in the lens barrel of the foregoing embodiment.

Referring to FIGS. 1 and 2, the phototaking optical system of this lens barrel consists of lens groups L1 and L2, in which the lens group L1 constitutes a focusing optical system for focusing, by movement in the axial direction, the image of an object at an arbitrary phototaking distance onto an unrepresented predetermined image plane (film plane).

On a fixed lens tube 1, there is fitted a cam ring 4 for moving the lens group L2 to effect a zooming operation. The fixed lens tube 1 is provided, on the internal periphery thereof, with a circumferential groove 1a, while the cam ring 4 is provided, on the external periphery thereof, with a circumferential projection 4a which engages with said groove 1a, whereby the cam ring 4 can only rotate about the optical axis, with respect to the fixed lens tube 1.

A lens holder 5 is fitted inside the cam ring 4 and supports the lens group L2.

A ring member 3 is fitted on the outside of the cam ring 4, and is coupled, through helicoid screws 3a, 2a, with a lens holder 2 supporting the lens group L1.

The lens holder 5 and the ring member 3 respectively have projecting parts 5b, 3b and move in the axial direction, through engagement with a cam groove of the cam ring 4 and a straight groove of the fixed lens tube 1, when said cam ring is rotated.

Also on the fixed lens tube 1 there are fitted a focusing ring 6 and a zooming ring 7.

The focusing ring 6 is provided with a straight groove 6a, in which is fitted a projection 2b of the lens holder 2. Thus, when the focusing ring 6 is rotated, the lens holder 2 is also rotated to axially move the lens group L1 through the helicoid screws 3a, 2a, thereby achieving a focusing operation.

Also the zooming ring 7 is provided with a projection 7a which engages with the cam ring 4. Thus, when the zooming ring 7 is rotated, the cam ring 4 is also rotated to axially move the lens groups L1, L2 thereby achieving a zooming operation.

The fixed lens tube 1 is also provided with encoder patterns 9, 10 for position detection, connected to a CPU 105 provided in the lens barrel. The focusing ring 6 and the zooming ring 7 respectively bear brushes 11, 12 which slide on said encoder patterns 9, 10 for detecting the position of the lens group L1 constituting the focusing optical system and the positions of the lens groups L1, L2 constituting the phototaking optical system.

FIG. 2 shows the relation between the position detecting encoder pattern 9 and the brush 11.

The fixed lens tube 1 is further provided with a bayonet mount 14 and electrical contacts 13, and the data communication with the camera body is enabled when said bayonet mount is mounted on a camera body (not shown in FIG. 1).

In the following there will be explained the configuration of the entire system, with reference to FIG. 6.

The lens barrel 101 is mounted on a camera body 103. A distance encoder 113, for detecting the absolute position of the focusing lens group L1, is composed of the brush 12 and the encoder pattern 10 as shown in FIG. 1. Said distance encoder 113 transmits code information, representing the absolute position of the focusing lens group L1, to a lens CPU (one-chip microcomputer) 105 through a line 115.

A focal distance encoder 117, for detecting the absolute position of the zooming lens group, is composed of the brush 11 and the encoder pattern 9, as shown in FIGS. 1 and 2. Said focal distance encoder 117 transmits code information, representing the absolute position of the zooming lens group L2, to the lens CPU 105 through a line 119.

The lens CPU 105 reads data of the phototaking distance, corresponding to the code information entered from the line 115, from a memory 107 and transmits said data to a body CPU 123 in the camera body 103 through a line 121.

Also the lens CPU 105 reads data on the error of phototaking distance, corresponding to the phototaking distance data and to the data of focal distance corresponding in turn to the code information entered from the line 119, from a memory 109 and transmits the read data to the body CPU 123 of the camera body 103 through the line 121.

In the following there will be given explanation on the various data transmitted from the lens barrel 101 to the camera body 103.

At first the phototaking distance data Xi is given, as shown in the following equation, by the sum of a constant term and the logarithm of phototaking distance multiplied by a constant:

$$Xi = A + (B \times 2/\log 2) \times \log (Ri) \qquad (1)$$

where in constants A, B are determined in the system designing and are constant regardless of the kind of lens or camera body.

In the camera body 103, the phototaking distance can be calculated from the phototaking distance data, according to the following equation:

$$Ri = 2^{\frac{Xi-A}{B \times 2}} \qquad (2)$$

wherein:

Xi: phototaking distance data;

Ri: set phototaking distance

A, B: constants

The data formatting according to the equations (1) and (2) allows appropriate setting of the precision (resolving power) and range of presentation of the distance by the phototaking distance data. More specifically, the resolving power which can be represented in apex conversion of the phototaking distance corresponds to 1/B [EV], and the range of representation can be shifted by suitable selection of the constant A.

For example, if the data range is Xi=0 to 255, and if A=50 and B=12, the range of representation is Ri=0.236–373, and the resolving power is 1/12 [EV].

In the following the format of the phototaking distance error data will be explained. The error data can be represented as:

$$E[+] = (C \times 2/\log 2) \times \log (R[e+]/Ri) \qquad (3)$$

$$E[-] = (C \times 2/\log 2) \times \log (R[e-]/Ri) \qquad (4)$$

wherein:

Ri: set phototaking distance;

R[e+]: actual phototaking distance at+side;

R[e−]: actual phototaking distance at−side;

E[+]: error data at+side;

E[−]: error data at−side;

C: constant.

In this format, 1/C [EV] is the resolving power of error data representation.

The equation (3) can be modified as:

$$(C \times 2/\log 2) \times \log (R[e+]) = (C \times 2/\log 2) \times \log (Ri) + E[+].$$

Through further modification by adding a constant A on both sides and substituting C=B, the phototaking distance data X[r+] corresponding to the actual phototaking distance R[+] at the+side can be represented as:

$$X[r+] = Xi + E[+] \qquad (5).$$

Through a similar modification, the phototaking distance data X[r−] corresponding to the actual phototaking distance R[−] at the−side can be represented as:

$$X[r-] = Xi + E[-] \qquad (6).$$

Thus, by setting the phototaking distance data in a format including the logarithm of phototaking distance and the phototaking distance error data in a format of the logarithm of ratio of the phototaking distances, it is made possible to use simple addition and subtraction as indicated by the equations (5) and (6) for determining the distance aberration corresponding to the error, from the phototaking distance data and the phototaking distance error data.

Also the apex conversion on logarithm enables processing with simple functions, even in the exposure calculation involving the absolute distance, such as the automatic flash exposure.

The error factors for the phototaking distance data include the resolving power of the distance encoder, focal point movement of the zoom lens, mechanical plays (for example, in the encoder brush), and error in the adjustment of the rear focal length of the lens. The magnitude of error varies depending on the phototaking distance and the focal distance. Consequently, the error data are read from the memory 109 according to the output codes of both of the distance encoder 113 and the focal distance encoder 117.

Figure 7:
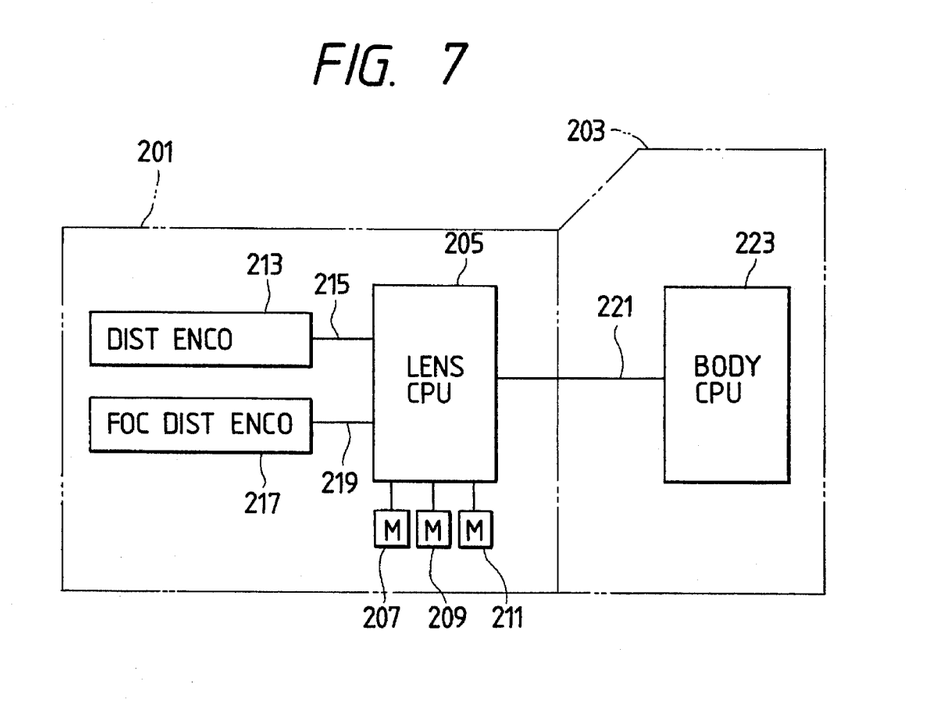
FIG. 7 is a block diagram of another embodiment of the camera system of the present invention.

Now reference is made to FIG. 7 for explaining the construction of another embodiment.

A lens barrel 201 is mounted on a camera body 203. A distance encoder 213 transmits code information, representing the absolute position of a focusing lens group L1, to a lens CPU 205 through a line 215. A focal distance encoder 217 transmits code information, representing the absolute position of a zooming lens group L2, to the lens CPU 205 through a line 219.

The lens CPU 205 reads data of the phototaking distance, corresponding to the code information entered from the line 215, from a memory 207, and transmits said data to a body CPU 223 in the camera body 203 through a line 221. It also reads data of the focal distance, corresponding to the code information entered from the line 219, from a memory 211 and transmits said data to the body CPU 223 of the camera body 203 through the line 221. Furthermore, the lens CPU 205 reads phototaking magnification correction data, corresponding to the phototaking distance data and the focal distance data, from the memory 209 and transmits said read data to the body CPU 223 of the camera body 203 through the line 221.

In the following there will be explained the phototaking magnification correction data, transmitted from the lens barrel 201 to the camera body 203.

In general the phototaking magnification Mi can be approximated by the focal distance f and the phototaking distance Ri as follows:

$$Mi = f/Ri \tag{7}$$

Figure 8:
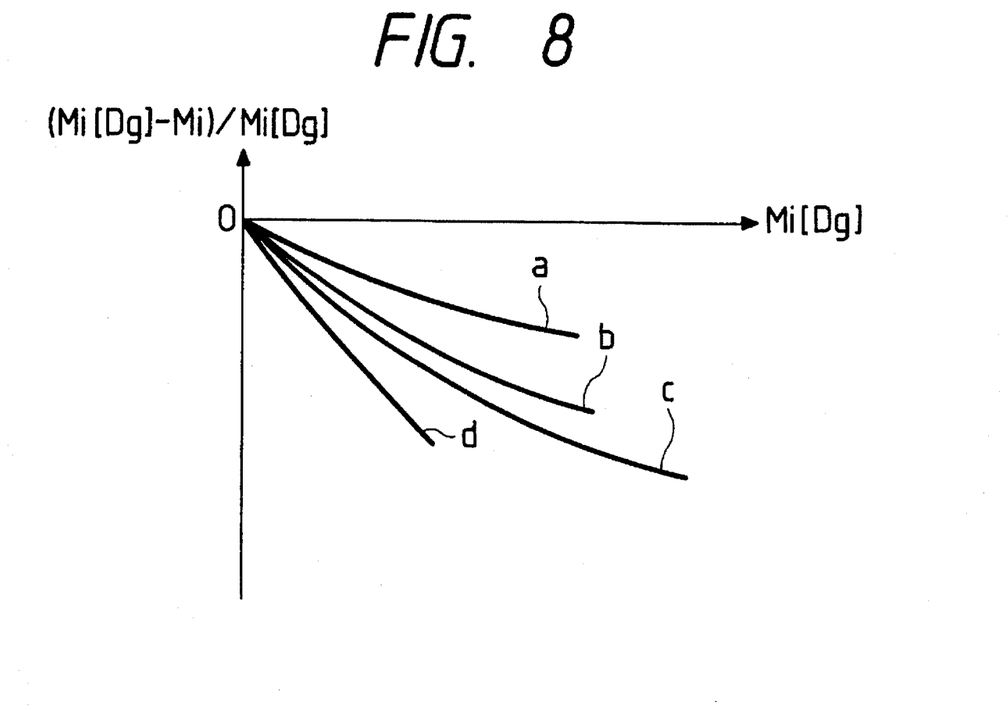
FIG. 8 is a chart showing the approximation error in the phototaking magnification in the phototaking lens device of the embodiment shown in FIG. 7.

However, though such approximation (7) is relatively accurate when the phototaking magnification is small (long distance side), the error increases with the increase in the phototaking magnification (short distance side). Curves (a)–(d) in FIG. 8 show plottings of the error, for the designed phototaking magnification Mi[Dg] in various lenses, calculated as:

$$(\text{error}) = (Mi[Dg] - Mi)/Mi[Dg].$$

In the present embodiment, therefore, the magnification Mi is corrected with a constant correction data D, which does not vary by the distance.

For example, the corrected magnification Mi' can be determined by the following correcting equation:

$$Mi' = (f/Ri)/[1 - (f/Ri) \times D] \tag{8}$$

Figure 9:
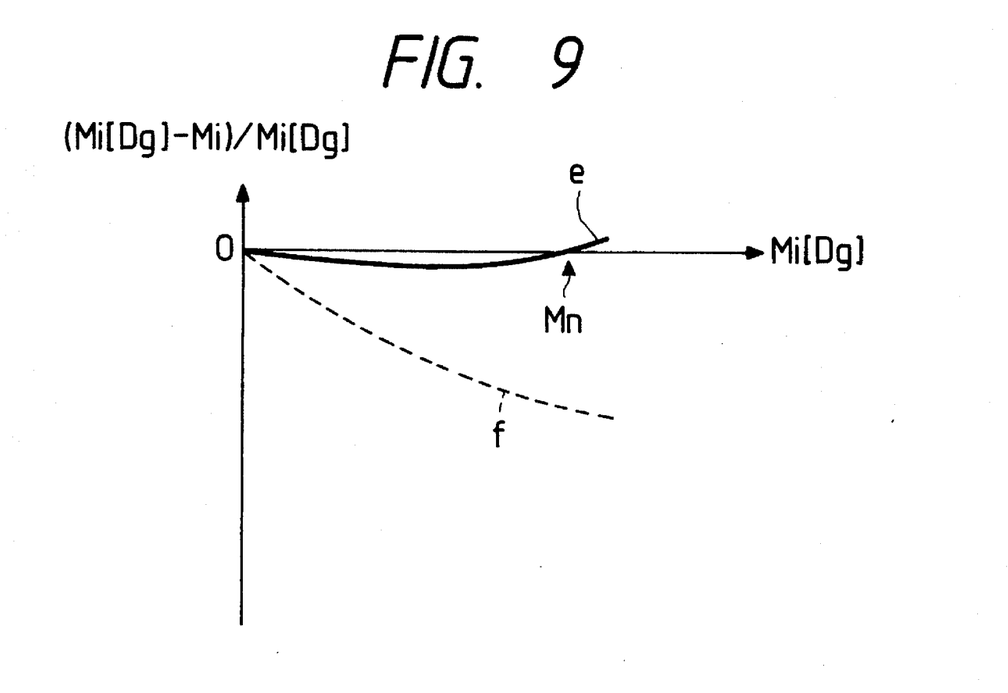
FIG. 9 is a chart showing the approximation error when the approximation is made with the phototaking magnification correcting data obtained in the phototaking lens device of the embodiment shown in FIG. 7.

FIG. 9 shows the effect when the correction as indicated in the equation (8) is applied, employing the phototaking magnification correction data. More specifically, a broken line (f) indicates:

(error before correction)=$(Mi[Dg] - Mi)/Mi[Dg]$ while a solid line (e) indicates:

(error after correction)=$(Mi[Dg] - Mi')/Mi[Dg]$. As will be apparent from FIG. 9, the phototaking magnification can be corrected "to achieve a small phototaking magnification error," by the selection of a suitable constant D.

As explained in the foregoing, instead of transmission of the corrected magnification M', variable according to the position of the distance encoder, to the camera body, there are transmitted the phototaking distance data, the focal distance data f independent of the distance and the magnification correction data D independent of the distance. Such method provides advantages such as the reduction in the capacity of the memory 209 in the lens.

As will be appreciated from the preceding description, the present invention enables more exact control which takes the error in the phototaking distance data into consideration, by transmitting the phototaking distance data and the error data to the camera body.

It is therefore rendered possible, for example, if the error is large, to use the phototaking distance data not in the actual control but only as a reference, and, if the error is small, to use said phototaking distance data as the control value, such as in the automatic flash mode.

Also the information on the phototaking magnification can be obtained more exactly by employing the constant magnification correction data which is independent from the phototaking distance, and the capacity of the memory means (ROM) can be reduced because said data is constant.

In the following there will be explained another embodiment of the present invention with reference to FIGS. 1 and 3.

FIG. 1 is a longitudinal cross-sectional view showing the mechanical construction of the lens barrel of the present embodiment.

The phototaking optical system of this lens barrel consists of lens groups L1 and L2, in which the lens group L1 constitutes a focusing optical system for focusing, by movement in the axial direction, the image of an object at an arbitrary phototaking distance onto a predetermined image plane (film plane).

On a fixed lens tube 1, there is fitted a cam ring 4 for moving the lens group L2 to effect a zooming operation. The fixed lens tube 1 is provided, on the internal periphery thereof, with a circumferential groove 1a, while the cam ring 4 is provided, on the external periphery thereof, with a circumferential projection 4a which engages with said groove 1a, thereby the cam ring 4 can only rotate about the optical axis, with respect to the fixed lens tube 1.

A lens holder 5 is fitted inside the cam ring 4 and supports the lens group L2.

A ring member 3 is fitted on the outside of the cam ring 4, and is coupled, through helicoid screws 3a, 2a, with a lens holder 2 supporting the lens group L1.

The lens holder 5 and the ring member 3 respectively have projecting parts 5b, 3b and move in the axial direction, through engagement with a cam groove of the cam ring 4 and a straight groove of the fixed lens tube 1, when said cam ring is rotated.

Also on the fixed lens tube 1 there are fitted a focusing ring 6 and a zooming ring 7.

The focusing ring 6 is provided with a straight groove 6a, in which fitted a projection 2b of the lens holder 2. Thus, when the focusing ring 6 is rotated, the lens holder 2 is also rotated to axially move the lens group L1 through the helicoid screws 3a, 2a, thereby achieving a focusing operation.

Also the zooming ring 7 is provided with a projection 7a which engages with the cam ring 4. Thus, when the zooming ring 7 is rotated, the cam ring 4 is also rotated to axially move the lens groups L1, L2 thereby achieving a zooming operation.

Figure 3:
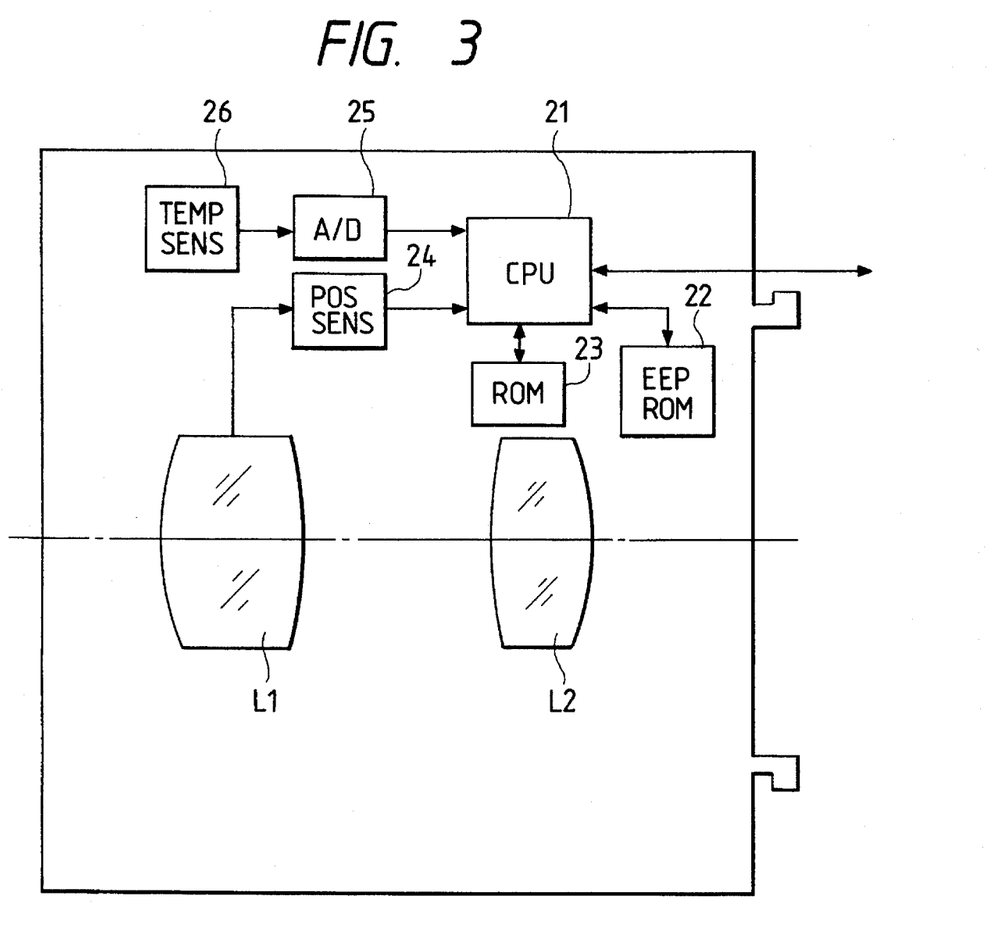
FIG. 3 is a block diagram of a control system in the lens barrel of said embodiment.

The fixed lens tube 1 is also provided with encoder patterns 9, 10 for position detection, connected to a CPU 21 provided in the lens barrel FIG. 3. The focusing ring 6 and the zooming ring 7 respectively bear brushes 11, 12 which slid on said encoder patterns 9, 10 for detecting the position of the lens group L1 constituting the focusing optical system and the positions of the lens groups L1, L2 constituting the phototaking optical system.

FIG. 2 shows the relationship between the position detecting encoder pattern 9 and the brush 11.

The fixed lens tube 1 is further provided with a bayonet mount 14 and electrical contacts 13, and the data communication with the camera body is enabled when said bayonet mount is mounted on a unrepresented camera body.

In the following there will be given explanation on the function of the present embodiment, taking, as an example, the method for correcting the error in the phototaking distance data, by FFD adjustment.

In the construction shown in FIG. 1, the thickness t of a washer 15 is adjusted in such a manner that the lens groups L1, L2 constituting the phototaking optical system focus the image of an object at the infinite distance onto the film plane, when the focusing ring 6 is set at the infinite object distance. However, in consideration of mass producibility, the focus position has to be set with a certain tolerance, so that individual lens barrels inevitably show fluctuations within the range of said tolerance. Thus the actual image plane of the phototaking optical system becomes aberrated by $\Delta x$ from the designed image plane, or the film plane.

On the other hand, the phototaking distance data etc. stored in the ROM of the lens barrel are given on the assumption that the image plane of the phototaking optical system coincides with the film plane, and therefore involve errors with respect to the actual phototaking distance.

For this reason, the lens barrel is provided therein with an EEPROM, capable of electrically writing and storing data, as shown in FIG. 3. The aberration between the film plane and the image plane at the FFD adjustment is measured for each lens barrel and the aberration data $\Delta x$ is recorded in the EEPROM 22 through the CPU 21 in the lens barrel.

Also a ROM 23 stores, in advance, the designed phototaking distance data $R_0$ corresponding to the position of the lens group L1, the movement amount data $x_0$ of the image plane when the lens group L1 moves from a position focused to the infinite object distance, and the focal distance f.

In the following there will be explained the method for correcting the phototaking distance data.

The position of the lens group L1 is detected through a position detecting device 24 consisting of the encoder patterns 9, 10 upon moving said lens group L1 in the axial direction and focusing it to a desired object, and the obtained positional information is transmitted to the CPU 21. The CPU 21 reads, from the ROM 23, the phototaking distance data $R_0$ corresponding to the position of the lens group L1 and the movement amount data $x_0$ of the image plane when the focusing lens L1 is moved from a position focused to the infinite distance. At the same time the CPU 21 reads the aberration data, recorded at the FFD adjustment, from the EEPROM 22.

In general, following relation (1) stands in approximate matter among the phototaking distance R, focal distance f and amount x of movement of image plane from the image plane focused to the infinite distance:

$$R=(x+f)^2/x \qquad (9)$$

The CPU 21 calculates the calculated value RCAL of the phototaking distance, employing the focal distance f and the image plane movement amount data $x_0$ in the equation (9), as shown in (10):

$$RCAL=(x_0+f)^2/x_0 \qquad (10).$$

Then, the phototaking distance RCAL' is determined from the equation (9) in consideration of the aberration $\alpha x$, as indicated in (11):

$$RCAL'=(x_0+\Delta x+f)^2/x_0+\Delta x \qquad (11)$$

The value of the equation (11), being an approximation, involves a certain error with respect to the actual phototaking distance. Consequently the result RCAL of the equation (10) and the strictly designed phototaking distance data $R_0$ are utilized for correcting the error of the equation (11) in the following manner:

$$R'=(RCAL'/RCAL) \cdot R_0 \qquad (12)$$

The value R' is very exact because the fluctuation in the image plane resulting from the FFD adjustment is corrected by the equation (11), and the error in the approximating equation employed in said correction is corrected by the equation (12).

Said phototaking distance data R' is transferred to the unrepresented camera body through the electrical contacts 13, and is used for various functions of the camera, such as exposure control.

In the above-explained embodiment, the image plane movement amount data $x_0$ from the image plane focused to the infinite distance, corresponding to the position of the lens group L1, is stored in the ROM 23. However said data $x_0$ may be omitted from the memory, as it can be calculated according to the equation (9).

In the foregoing there has been explained the correction of error in the phototaking distance data, resulting from the fluctuation in the image plane by the FFD adjustment, but the correction of error in the phototaking distance, resulting from other causes can be conducted in the identical manner by recording the aberration $\Delta x$ between the image plane of the phototaking optical system and the film plane, in the EEPROM of the lens barrel.

For example, in a zoom lens, the image position moves slightly between the wide angle side and the telephoto side, so that the phototaking distance data contains an error. In such case, exact phototaking distance data can be obtained over the entire zooming range, by storing the aberrations $\Delta x$ of the image plane at different focal distances in a ROM or an EEPROM, and correcting the phototaking distance as explained before, employing the aberration $\Delta x$ at a focal distance detected by the zoom encoders 10, 12.

Also the aberration in the image plane, resulting from temperature change, becomes large particularly if a low dispersion lens is employed in the optical system. In such case the aberration $\Delta x$ as a function of the temperature is recorded in the form of a table or as a continuous function in the EEPROM 22 or the ROM 23.

Figure 4:
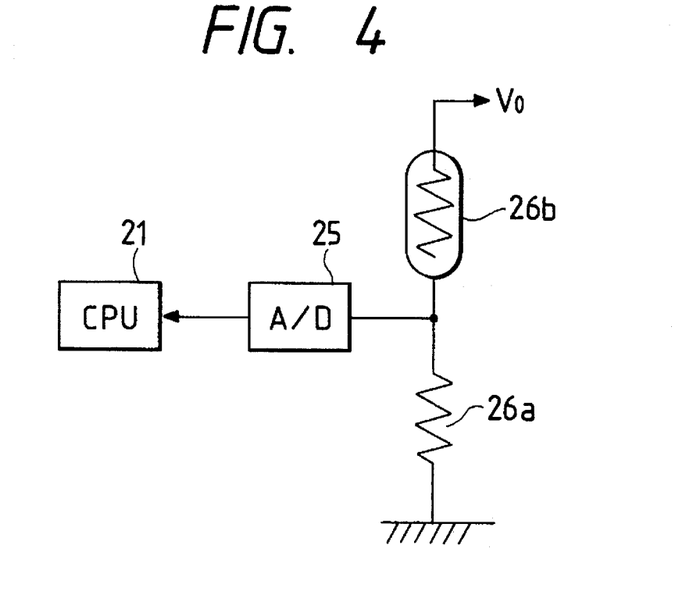
FIG. 4 is a circuit diagram of a temperature detecting device employed in another embodiment of the lens barrel.

Temperature detection is executed by a simple temperature detector 262 and 266 employing a thermistor as shown in FIG. 4, and the temperature information is transmitted to the CPU 21 through an A/D converter 25. Thus exact phototaking distance information can always be obtained, even in case of temperature change, by correcting the phototaking distance data in the same manner by the aberration $\Delta x$ of image plane at each temperature.

Furthermore, for the aberration of the image plane resulting from variation in the aberrations of the optical system, the phototaking distance data can be corrected in the identical manner.

Figure 5:
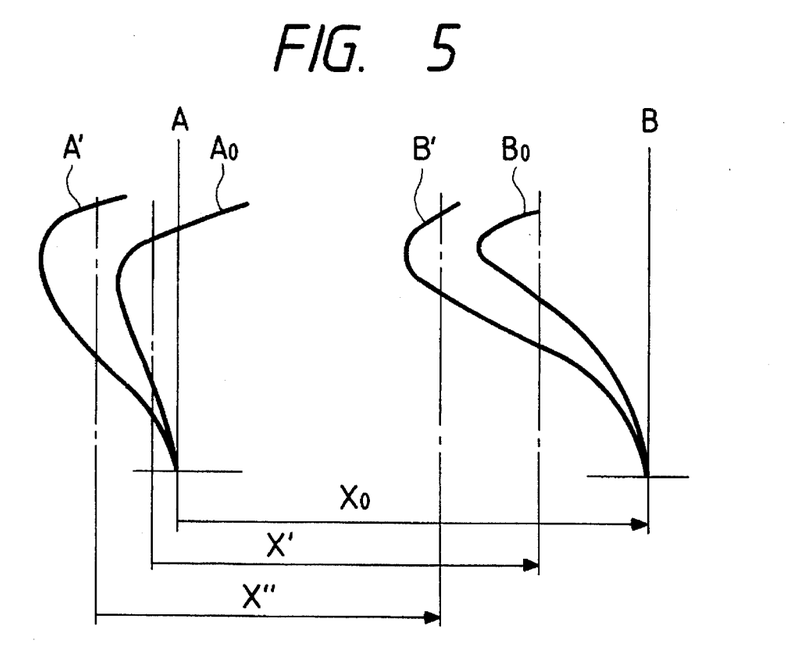
FIG. 5 is a chart showing the variation in aberrations in still another embodiment of the lens barrel.

In FIG. 5, $A_0$ is a designed aberration curve at the infinite object distance, and $B_0$ is a designed aberration curve at the shortest object distance. A' and B' are corresponding aberration curves of a particular lens barrel, indicating the fluctuation in the manufacture.

Usually, the designed lens advancement amount from the infinite object distance to the shortest object distance is $X_0$. However, the lens advancement amount X' from the best position at the infinite object distance to the best position at the shortest object distance is different from $X_0$, because the aberration curves $A_0$ and $B_0$ for the infinite and shortest object distances are different.

Furthermore, if the fluctuation in the manufacture is taken into consideration, the advancement amount X" becomes additionally different from $X_0$. Exact phototaking distance data without the influence of variation in the aberrations can be obtained by storing these errors or the image plane aberration $\Delta x$ in the EEPROM 22 and correcting the phototaking distance data in the above-explained manner.

As explained in the foregoing, even if the phototaking distance data stored in the memory means of the lens barrel is aberrated from the actual phototaking distance, the phototaking distance data may be corrected, in the calculation means such as the CPU provided in the lens barrel, employing the aberration data $\Delta x$ of each lens barrel, stored in the memory means of said lens barrel.

Consequently the phototaking distance data which corresponds to the actual value with high accuracy can be obtained, and the fluctuation among the lens barrels can also be reduced since the aberration $\Delta x$ in each lens barrel is stored in the EEPROM. Therefore various controls employing the phototaking distance data, such as the exposure control, can be attained with a high precision, and a camera system with highly reliable functions can be realized.

What is claimed is:

1. A lens barrel mountable on a camera body, comprising:

a phototaking lens system;

absolute position detection means for detecting the absolute position of a focusing lens group of said phototaking lens system in the axial direction;

phototaking distance data memory means storing phototaking distance data corresponding to the absolute position of said focusing lens group of said phototaking lens system;

aberration data memory means storing data of aberration between a predetermined image plane and the actual image plane of said phototaking lens system;

calculation means for calculating corrected phototaking distance data corresponding to an absolute position to which said focusing lens group is set when focused on an object, by correcting the corresponding phototaking distance data based on said aberration data; and means for transferring the corrected phototaking distance data to said camera body.

2. A lens barrel according to claim 1, wherein said aberration data indicates the aberration between the image plane of said phototaking lens system after FFD adjustment and the predetermined image plane.

3. A lens barrel according to claim 1, wherein said aberration is a measured value after FFD adjustment, and said aberration data memory means is a writable memory.

4. A lens barrel according to claim 1, wherein said aberration data indicates the aberration between the image plane of said phototaking lens system and the predetermined image plane as a function of temperature.

5. A lens barrel according to claim 1, wherein said aberration data indicates the aberration between the image plane of said phototaking lens system and the predetermined image plane, resulting from a variation in the focal distance.

6. A lens barrel according to claim 1, wherein said aberration data indicates the aberration between the image plane of said phototaking lens system and the predetermined image plane, resulting from a variation in the aberrations caused by a change in the phototaking distance.

7. A lens barrel according to claim 1, wherein said absolute position detection means is an encoder.

8. A lens barrel according to claim 1, wherein said predetermined image plane is an image plane determined at the designing of said phototaking lens system.

9. A lens barrel mountable on a camera body, comprising:

a phototaking lens system;

absolute position detection means for detecting the absolute position of a focusing lens group of said phototaking lens system in the axial direction;

phototaking distance data memory means storing phototaking distance data corresponding to the absolute position of said focusing lens group of said phototaking lens system;

image plane movement amount data memory means storing data of movement amount of the image plane, from an image plane for an infinite object distance, corresponding to the absolute position of said focusing lens group of said phototaking lens system;

aberration data memory means storing data of aberration between a predetermined image plane and the actual image plane of said phototaking lens system;

calculation means for calculating corrected phototaking distance data corresponding to an absolute position to which said focusing lens group is set when focused on an object, by correcting the corresponding phototaking distance data based on said movement amount data and said aberration data; and means for transferring the corrected phototaking distance data to said camera body.

10. A lens barrel according to claim 9, wherein said aberration data indicates the aberration between the image plane of said phototaking lens system after FFD adjustment and the predetermined image plane.

11. A lens barrel according to claim 9, wherein said aberration data indicates the aberration between the image plane of said phototaking lens system and the predetermined image plane as a function of temperature.

12. A lens barrel according to claim 9, wherein said aberration is a measured value after FFD adjustment, and said aberration data memory means is a writable memory.

13. A lens barrel according to claim 9, wherein said aberration data indicates the aberration between the image plane of said phototaking lens system and the predetermined image plane, resulting from a variation in the focal distance.

14. A lens barrel according to claim 9, wherein said aberration data indicates the aberration between the image plane of said phototaking lens system and the predetermined image plane, resulting from a variation in the aberrations caused by a change in the phototaking distance.

15. A lens barrel according to claim 9, wherein said absolute position detection means is an encoder.

16. A lens barrel according to claim 9, wherein said predetermined image plane is an image plane determined at the designing of said phototaking lens system.

17. A lens barrel mountable on a camera body, comprising:

a focusing lens group;

a distance encoder for detecting the absolute position of said focusing lens group in the axial direction;

memory means storing phototaking distance data corresponding to a set phototaking distance indicated by an output of said distance encoder when said focusing lens group is at an in-focus position, and phototaking distance error data representing an error between (a) actual phototaking distance corresponding to said in-focus position of said focusing lens group and (b) said set phototaking distance; and an output device for sending said phototaking distance data and said phototaking distance error data to said camera body.

18. A lens barrel according to claim 17, wherein said phototaking distance error data indicates a value corresponding to a possible range of error between actual phototaking distance and said set phototaking distance.

19. A camera system comprising a lens barrel according to claim 17 and a camera body, wherein said camera body includes a signal processing device for receiving said phototaking distance data and said phototaking distance error data from said lens barrel, and varying processing of said phototaking distance data based on said phototaking distance error data.

20. A camera system comprising a lens barrel according to claim 17 and a camera body, wherein said camera body includes a signal processing device for receiving said phototaking distance data and said phototaking distance error data from said lens barrel, and varying the processing of said phototaking distance data based on said phototaking distance error data.

21. A lens barrel according to claim 17, wherein:

said phototaking distance data is determined by a first equation composed of a term including logarithm of said set phototaking distance, and a constant term; and said phototaking distance error data is determined by a second equation including logarithm of a ratio of actual phototaking distance to said set phototaking distance.

22. A lens barrel according to claim 21, wherein said first equation is given as:

$$Xi = A + (B \times 2/\log 2) \times \log (Ri)$$

in which:

Xi: phototaking distance data;
Ri: set phototaking distance;
A, B: constants, and said second equation is given as:

$$E[\pm] = (C \times 2/\log 2) \times \log (R[e\pm]/Ri)$$

in which:

R[e±]: actual phototaking distance;
E[±]: error data;
C: constant.

23. A lens barrel mountable on a camera body, comprising:

a phototaking lens system;

a distance encoder for detecting the absolute position of a lens of said phototaking lens system in the axial direction;

memory means storing phototaking distance data corresponding to a set phototaking distance indicated by the output of said distance encoder, focal distance data representing the focal distance of said phototaking lens system, and magnification correction data; and an output device for outputting said phototaking distance data, said focal distance data and said magnification correction data;

wherein said magnification correction data indicates a correction coefficient for determining a set phototaking magnification from said focal distance data and said phototaking distance data, and said magnification correction data is not varied with the phototaking distance.

24. A camera system comprising a lens barrel according to claim 23 and a camera body, wherein said camera body includes a signal processing device for receiving said phototaking distance data, said focal distance data and said magnification correction data from the output device of said lens barrel and determining the set phototaking magnification from said received data.

25. A lens barrel according to claim 23, wherein the set phototaking magnification is given by:

$$Mi' = (f/Ri)/[1 - (f/Ri) \times D]$$

wherein:

Mi': set phototaking magnification;
Ri: set phototaking distance represented by said phototaking distance data;
f: focal distance represented by said focal distance data;
D: magnification correction data.

26. A lens barrel mountable on a camera body, comprising:

a focusing lens group;

a distance encoder for detecting the absolute position of said focusing lens group in an optical axis direction;

memory means for storing phototaking distance data corresponding to the output of said distance encoder, and phototaking distance error data corresponding to an error between (a) the phototaking distance data and (b) actual phototaking distance corresponding to the detected position of said focusing lens group; and an output device for outputting said phototaking distance data and said phototaking distance error data to said camera body.

27. A lens barrel mountable on a camera body, comprising:

a phototaking lens system;

a distance encoder for detecting the absolute position of a focusing lens group in said phototaking lens system in an optical axis direction;

memory means for storing phototaking distance data corresponding to a set phototaking distance indicated by the output of said distance encoder, focal distance data representing the focal distance of said phototaking lens system, and phototaking magnification correction data representing a correction coefficient corresponding to the focal distance data and independent of phototaking distance; and an output device for outputting said phototaking distance data, said focal distance data and said phototaking magnification correction data to said camera body.

28. A camera system comprising a lens barrel according to claim 27, and a camera body, wherein said camera body includes a signal processing device for receiving said phototaking distance data, said focal distance data and said phototaking magnification correction data from said lens barrel, and determining a set phototaking magnification based on said received data.

* * * * *